United States Patent
Kant

(10) Patent No.: US 9,832,714 B2
(45) Date of Patent: Nov. 28, 2017

(54) METHOD AND SYSTEM FOR NETWORK NODE SELECTION BASED USER EQUIPMENT AGENT ASSISTED MODIFICATION OF TEMPORARY IDENTITY IN 3G AND 4G NETWORKS

(71) Applicant: MAVENIR SYSTEMS, INC., Richardson, TX (US)

(72) Inventor: Nishi Kant, Fremont, CA (US)

(73) Assignee: MAVENIR SYSTEMS, INC., Richardson, TX (US)

( * ) Notice: Subject to any disclaimer, the term of this patent is extended or adjusted under 35 U.S.C. 154(b) by 0 days.

(21) Appl. No.: 14/622,545

(22) Filed: Feb. 13, 2015

(65) Prior Publication Data
US 2016/0242110 A1   Aug. 18, 2016

(51) Int. Cl.
| | |
|---|---|
| *H04W 4/00* | (2009.01) |
| *H04W 48/18* | (2009.01) |
| *H04W 4/02* | (2009.01) |
| *H04W 48/16* | (2009.01) |
| *H04W 8/08* | (2009.01) |
| *H04W 8/10* | (2009.01) |

(52) U.S. Cl.
CPC ............ *H04W 48/18* (2013.01); *H04W 4/02* (2013.01); *H04W 8/082* (2013.01); *H04W 8/10* (2013.01); *H04W 48/16* (2013.01)

(58) Field of Classification Search
CPC ....... H04W 48/18; H04W 48/16; H04W 8/10; H04W 4/02; H04W 8/082; H04B 1/3816

USPC ........................................... 455/435.2, 435.3
See application file for complete search history.

(56) References Cited

U.S. PATENT DOCUMENTS

| | | | |
|---|---|---|---|
| 9,294,909 B2 * | 3/2016 | Li | |
| 2002/0061746 A1 | 5/2002 | Jo et al. | |
| 2004/0008657 A1 | 1/2004 | Lee et al. | |
| 2004/0107146 A1 | 6/2004 | Alfano | |
| 2004/0162818 A1 | 8/2004 | Shaw | |
| 2008/0200156 A1 | 8/2008 | Hicks et al. | |
| 2009/0156201 A1 | 6/2009 | Pudney et al. | |
| 2010/0041403 A1 * | 2/2010 | Khetawat ............... | H04W 8/02 455/435.1 |
| 2010/0184454 A1 | 7/2010 | Luft et al. | |
| 2010/0278041 A1 | 11/2010 | Shi | |
| 2011/0026469 A1 | 2/2011 | Wu | |
| 2012/0033659 A1 | 2/2012 | Zhang et al. | |
| 2012/0275401 A1 | 11/2012 | Sun | |
| 2012/0282924 A1 | 11/2012 | Tagg et al. | |
| 2013/0029637 A1 | 1/2013 | Hillier et al. | |
| 2013/0103939 A1 | 4/2013 | Radpour | |
| 2014/0349611 A1 | 11/2014 | Kant et al. | |

\* cited by examiner

*Primary Examiner* — Amancio Gonzalez
(74) *Attorney, Agent, or Firm* — Ohlandt, Greeley, Ruggiero & Perle, L.L.P.

(57) ABSTRACT

The embodiments described herein relate generally to a method and system for using mobility management entity (MME) or Serving GPRS Support Node (SGSN) pooling features depending on whether it is a 3G or 4G network and adding an enhancement in the User Equipment (UE) whereby it uses location information (e.g., broadcast Public Land Mobile Network Identity (PLMN ID), Tracking Area (TA), Cell Identification, Global Positioning System (GPS) coordinates or the like) to decide from which MME or SGSN it should obtain services.

8 Claims, 3 Drawing Sheets

METHOD AND SYSTEM FOR NETWORK NODE SELECTION BASED USER EQUIPMENT AGENT ASSISTED MODIFICATION OF TEMPORARY IDENTITY IN 3G AND 4G NETWORKS

FIELD OF THE INVENTION

The present invention relates generally to general packet radio service (GPRS) networks and its evolution including but not limited to Universal Mobile Telecommunication System (UMTS) and Long Term Evolution (LTE). More particularly, this invention relates to a method and system for using mobility management entity (MME) or Serving GPRS Support Node (SGSN) (depending on whether the network is 3G or 4G) pooling features and adding an enhancement in the User Equipment (UE) whereby it uses location information (e.g., broadcast Public Land Mobile Network Identity (PLMN ID), Tracking Area (TA), Cell Identification, Global Positioning System (GPS) coordinates or the like) to decide from which MME or SGSN it should obtain services.

BACKGROUND

Mobile broadband data networks are becoming pervasive in modern day life. Not long ago, there were only a handful of mobile device manufacturers and the mobile network was accessible to such mobile devices for a small set of use cases such as mobile voice or narrowband data. Today the broadband mobile network is used by a wide variety of devices (e.g., smartphone, tablets, data modem, e-book readers, cars, smart meters, etc.) for general or special purpose communication. Low cost or free mobile operating systems such as Android®, Firefox® and the like have made it possible for mobile devices to have broadband connectivity. The mobile broadband network includes licensed 3rd Generation (3G)/4th Generation (4G) networks and hybrid networks combining Wi-Fi access with 3G/4G networks. In recent times, the popularity of Android® has added more devices types than ever before to this crowded environment.

SUMMARY

Aspects of the disclosure herein include a computer implemented method for provisioning a UE identification information in a User Equipment (UE) that is connected to a first mobile core network and steering signals received from the UE to a second mobile core network, the method comprising: updating the UE identification information in a User Identification Module in the UE to correspond to the second mobile core network; receiving a signal at a radio access node from the UE including the updated UE identification information and forwarding the signal to the second mobile core network; and performing a procedure at the second mobile core network to identify and authenticate the UE and assigning a new identification information to the UE.

Other aspects of the disclosure herein include a computer implemented method for provisioning a UE identification information in a User Equipment (UE) that is connected to a first mobile core network and steering signals received from the UE to a second mobile core network, the method comprising: sending a provisioning signal to the UE from an Over The Air Provisioning (OTAP) server which includes information on locations of the second mobile core network and instructions on when and how to rewrite the UE identification information based on the location of the UE and the second mobile core network; when the location of the UE indicates that a second mobile core network is available in the same region, providing an initial Globally Unique Temporary UE Identity (GUTI) indicator to a UE Identification Module in the UE to update a Globally Unique Mobile Management Entity Identifier (GUMMEI) portion of a GUTI corresponding to the second mobile core network; receiving a signal at a radio access node from the UE including the updated UE identification information and forwarding the signal to the second mobile core network; and performing a procedure at the second mobile core network to identify and authenticate the UE and assigning a new identification information to the UE.

Other aspects of the disclosure herein include a system having a plurality of network elements for provisioning a UE identification information in a User Equipment (UE) that is connected to a first mobile core network and steering signals received from the UE to a second mobile core network, the system comprising: an application located in the UE and configured to update the UE identification information in a User Identification Module in the UE to correspond to the second mobile core network when the location of the UE is in the same region as the second mobile core network; and a radio access node configured to receive a signal from the UE including the updated UE identification information and forward the signal to the second mobile core network.

BRIEF DESCRIPTION OF THE DRAWINGS

The present invention is illustrated by way of example and not limitation in the figures of the accompanying drawings in which like references indicate similar elements.

DETAILED DESCRIPTION

Device characteristics and communication need differ widely among communication devices. The application or business use for many devices could be different as well, for example, Kindle® or education devices. The traditional mobile network was designed for the human consumer market. Therefore, it might be desirable to steer certain devices to packet core nodes that have different scaling and virtualization capabilities. Machine to machine (M2M) communication over broadband wireless network follows a fundamentally different cost structure. These type of M2M devices typically have a relationship with the enterprise that owns them. Most M2M offerings currently in the market treat the cellular network as a transport pipe. While this approach is simple and can be deployed using the existing cellular infrastructure, it ignores the fact that machine type communication (MTC) needs are inherently different than those for a human subscriber. Machine type communication from smart meters or from telemetered devices is usually in short and infrequent bursts. Therefore interaction from these devices is more signaling intensive than data intensive; i.e., the amount of data that is communicated between the device and the network is often times very small and there are many signaling exchanges to establish the data channel between the device and the network. Furthermore, a number of MTC devices can be a lot bigger than that of single user subscribers, e.g., a smart meter deployed in a county could be in the millions. After a power outage, a large number of machines may try to register with the network and thereby overwhelm it. If these MTC devices compete for same network resources as that by human devices, they might cause congestion and affect overall performance of the network. Hence it might be desirable to steer such devices to network nodes that are designed to cope with characteristics of MTC.

Figure 1A:
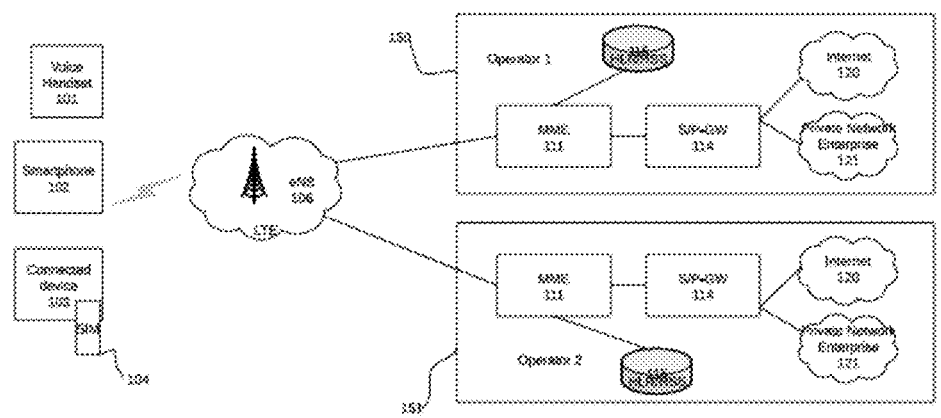
FIG. 1A is a schematic illustrating a prior art multi operator core network (MOCN).
Figure 1B:
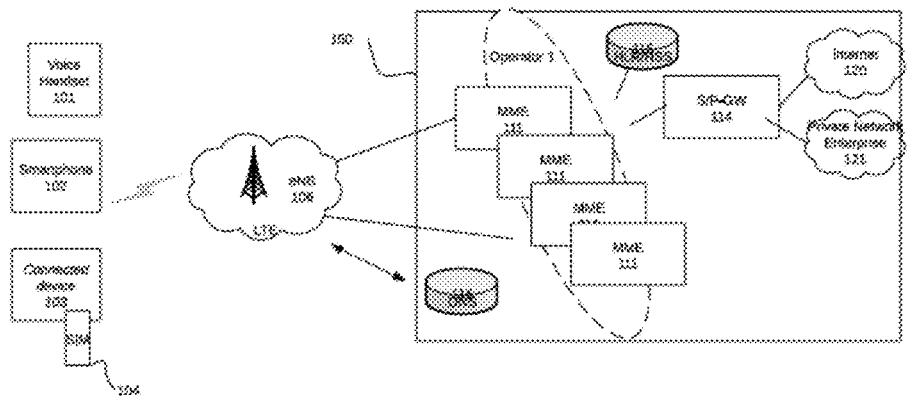
FIG. 1B is a schematic illustrating a prior art pooling of a plurality of Mobility Management Entities (MMEs) in a 4G network.
Figure 2:
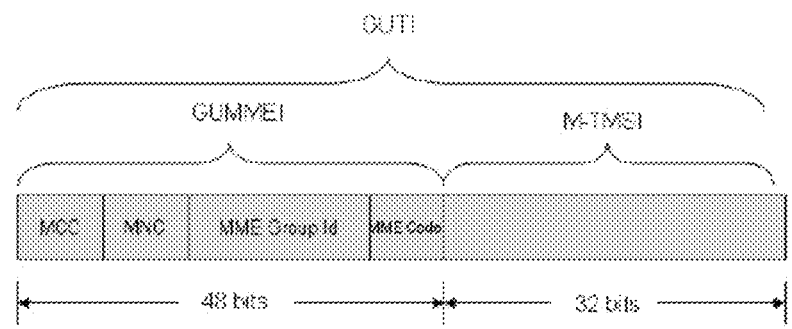
FIG. 2 shows a structure of a Globally Unique Temporary Identification (GUTI) which may be used by the embodiments described herein.

FIG. 1 is a schematic showing a network sharing scenario with a variety of UEs (e.g., 101, 102, 103) having a User Identification Module (e.g., a SIM card) 104 able to attach to a prior art Multi-Operator Core Network in which multiple core networks typically belonging to different operators (i.e., AT&T, Verizon, etc.) 150, 151 share a common Evolved Universal Terrestrial Across Network node B (eNB) 106. Each of the operators has an MME 111, S/P-GW 114 and HLR/HSS 115 and are connected to the Internet 120 and/or a private network enterprise 121. FIG. 2 is a schematic rendering of an operator controlled core network 150 having a pool of MMEs 111 for load balancing during high use conditions.

3rd Generation Partnership Project (3GPP) describes Network Node Selection Function (NNSF) in a radio network controller (RNC) or eNB 106 (i.e., TS 23.236) that uses encoding of permanent identities such as international mobile subscriber identity (IMSI) or temporary identities such as a Packet Temporary Mobile Subscriber Identity (P-TMSI) and Globally Unique Temporary UE Identity (GUTI) for proper selection of network nodes such as SGSN or MME. Such selection is important when SGSN(s) and MME(s) are pooled together or when a Radio Access Network (RAN) is shared across multiple operators, i.e., a multiple operation core network (MOCN) as shown in FIG. 2. In general the NNSF logic is proprietary and is limited to load consideration in the pool or PLMN code in case of RAN sharing and therefore selection of an SGSN or MME based on device type or any other granular criteria is not possible. Ericsson U.S. Patent Publication No. 20110230188, filed Jan. 10, 2011, which is hereby incorporated herein in its entirety, discloses extending the standard mechanism that allows node selection based on bits of IMSI after the mobile network code (MNC). In 3GPP Release 12, it allows MTC type indication for network node selection. However introducing such capability requires support of MTC identification at UE and RNC/eNodeB and therefore requires a system wide software upgrade which can be expensive. Often an MOCN is a licensed feature by the eNB/RNC vendor which implies additional cost aside from complexity of introducing a new PLMN. The method and system disclosed herein achieves the same goal of selected device steering (or mapping) but without requiring any upgrade at an eNB/RNC or at a network node such as an SGSN or MME.

An aspect of the preferred embodiment is to use the MME/SGSN pooling feature (i.e., load sharing between multiple core network nodes) and add an enhancement in the UE whereby it uses location information (e.g., broadcast Public Land Mobile Network Identity (PLMN ID), Tracking Area (TA), Cell Identification, Global Positioning System (GPS) coordinates or the like) to decide which MME/SGSN it should obtain services. Specifically, this enhancement information can be put in the 3GPP defined signaling sent from the UE so that network node selection function at an eNB/RNC selects a predetermined address such as a virtualized evolved packet core (VEPC) based on this discriminator.

FIG. 2 describes the UE identification information (e.g., a GUTI structure) and how the information in the UE identification information is used in the embodiments disclosed herein. The GUTI has two main parts—the Globally Unique MME Identifier (GUMMEI) and the MME Temporary Mobile Subscriber Identity (M-TMSI). The GUMMEI uniquely identifies a MME globally. The M-TMSI has significance only within that MME. When MME pooling is used, the plurality of MMEs belong to a group (identified by a Group ID) and each MME has a unique code within that group (i.e., identified MME Code). Based on this information an eNB is able to route the signaling to the MME that has UE context. It is clear that the MME Group ID and MME Code together uniquely identify the MME in a given PLMN identified by Mobile Country Code (MCC)+Mobile Network Code (MNC). The GUMMEIs of all the MMEs that the eNB is connected to, can be configured directly at the eNB or can be resolved with the help of domain name system (DNS) lookup.

When the UE starts for the first time, it only has its permanent identity IMSI and it uses that to register with the network through the attach process. Upon successful completion of that process, the MME assigns a GUTI as a temporary identity to the UE. After that the UE continues to use the GUTI all the time unless the network does not understand the GUTI and asks the UE to provide the IMSI. When UE moves from one MME to another the new MME requests the context from the old MME and then assigns a new GUTI to the UE. The MME may assign a new GUTI after some time has elapsed. On the UE side, the GUTI is stored as a structured file at the User Identification Module (e.g., Universal Integrated Circuit Card (UICC) card (e.g., a subscriber identity module (SIM) card)).

Figure 3:
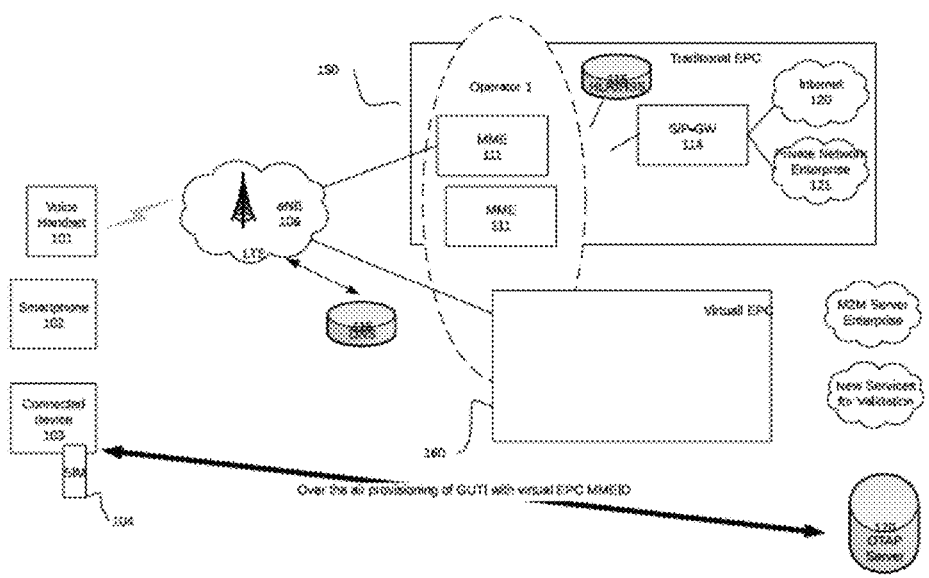
FIG. 3 is a schematic illustrating an implementation of the embodiments described herein.

As disclosed herein and illustrated by FIG. 3, UEs 101, 102, and 103 are attached to a radio access node (e.g., eNB 106) and a first core network (e.g., core network 150). An enhanced UE shall contain a software application and/or logic whereby it selects a predefined GUMMEI based on location information present in broadcast Public Land Mobile Network Identity (PLMN ID), Tracking Area (TA), Cell Identification, Global Positioning System (GPS) coordinates or the like. Further, such a predefined GUMMEI identifies a second core network (e.g., VEPC 160) present in the region. The VEPC 160 may be connected to an M2M Server and/or a New Services for Validation server. The list of VEPCs specific to location zones can be obtained in at least two ways. In a first method, the list of VEPCs is updated by an over the air provisioning signal (also know as over the air programming) (OTAP) from an OTAP server 170. Typically, OTAP is used for variety of administrative activities and is considered a secure operation. The provisioning signal may include information on locations of VEPCs and instructions on when and how to rewrite the identification information in the User Identification Module. The provisioning signal may also include a precondition for updating the UE identification information which depends on the location of the UE. In addition, the provisioning signal may include a another precondition for updating the UE identification information which is triggered by a UE sending a signal to sign up for services offered by each of a plurality of mobile core networks. In a second method, a secure application module which is ideally pre-loaded onto the UE is configured to contact an Internet location to obtain a list of VEPCs. The secure application module may include a server address information for the UE to contact to determine which second mobile core network to be connected. Contacting the server may be triggered either periodically, by time of a day, or by a change of a location of the UE. Through any of these methods the enhanced UE receives the predefined GUMMEI information and instructions to start using a predetermined VEPC 160.

If the location of the UE indicates to the software application and/or logic present in the UE that a VEPC (such as reference item 160 in FIG. 3) is available in the area, the enhanced UE containing the installed software application encodes and writes an "initial GUTI" indicator with GUMMEI into the User Identification Module and invokes a location update (Routing Area Update (RAU)/Tracking Area Update (TAU)) to initiate signaling with an eNB 106 and it would then have a GUMMEI (or predetermined address) corresponding to the VEPC 160 in the User Identification Module. After this point all communications from the enhanced UE will be steered toward the VEPC 160. While this disclosure implements the embodiments of this disclosure with the help of a GUTI, it may also be practiced with other temporary identities as well (e.g., in a 3G network a P-TMSI would be rewritten into the User Identification Module). Since the objective is to route the signaling to a VEPC 160, the M-TMSI does not matter.

The eNB 106 will resolve the GUMMEI with a local table or through a DNS 116 to the VEPC 160 and therefore route this and subsequent message from this UE to the VEPC. Since the M-TMSI used in the construction of the initial GUTI was arbitrary, it is not sufficient for the VEPC 160 to identify the UE. Therefore it will interrogate an IMSI from the UE. The UE will respond with its IMSI and the VEPC will then allocate a new GUTI to this UE. Since the GUMMEI part remains the same, the subsequent signaling will keep coming to VEPC 160. Upon successful completion of this procedure, the UE will change the indicator that GUTI is no longer the "initial GUTI".

If the UE travels beyond the VEPC 160 reachable area, the serving MME in that region will not understand the GUTI and request for an IMSI and continue to work. When the UE returns back to a VEPC reachable area, the enhanced UE will notice that a VEPC is available in the location. It will also notice that the current GUTI has a GUMMEI that is different than that of this VEPC. In this case it will again follow the steps in creation of an initial GUTI and subsequent steps as described above.

Another embodiment disclosed herein is where steering of certain devices is very useful in the case of the wholesale or mobile virtual network operator (MVNO) scenario. In this case all devices belonging to a certain MVNO or bulk customer can be steered to a VEPC that is virtualized to host many such entities. Once the devices are steered to a VEPC, the new capabilities and superior interaction with an enterprise network can be achieved without creating disturbance or impact on the exiting 3G/4G network.

A network that already has deployed eNBs and MME pools is serving human users. Assuming that an operator wants to introduce an M2M service for enterprises where they can connect a variety of machines to their enterprise network over operator's wireless network. Further assume that instead of using a deployed packet core, the operator wants to host such M2M enterprises on a VEPC. By assigning the VEPC a GUMMEI and configuring it in the eNBs or the DNS server, the eNB will be able to select the VEPC correctly whenever signaling from UE contains a matching GUMMEI. The deployment of the VEPC and its reachability within a certain geography is an important consideration. If the VEPC is not reachable from the location the UE is in, it will be served by a regular evolved packet core (EPC). For example, in the case of a "Connected Car" (i.e., a vehicle in contact with a network) it is possible that the car travels beyond the region where a VEPC was reachable. In this case the Connected Car could be served by the regular packet core. In other words, where a VEPC exists, the designated use cases (i.e., M2M, Connected Car, MVNO) should be routed to the VEPC instead of the regular EPC. In geographies from where VEPC is not reachable these devices could be served by a regular EPC.

Figure 4:
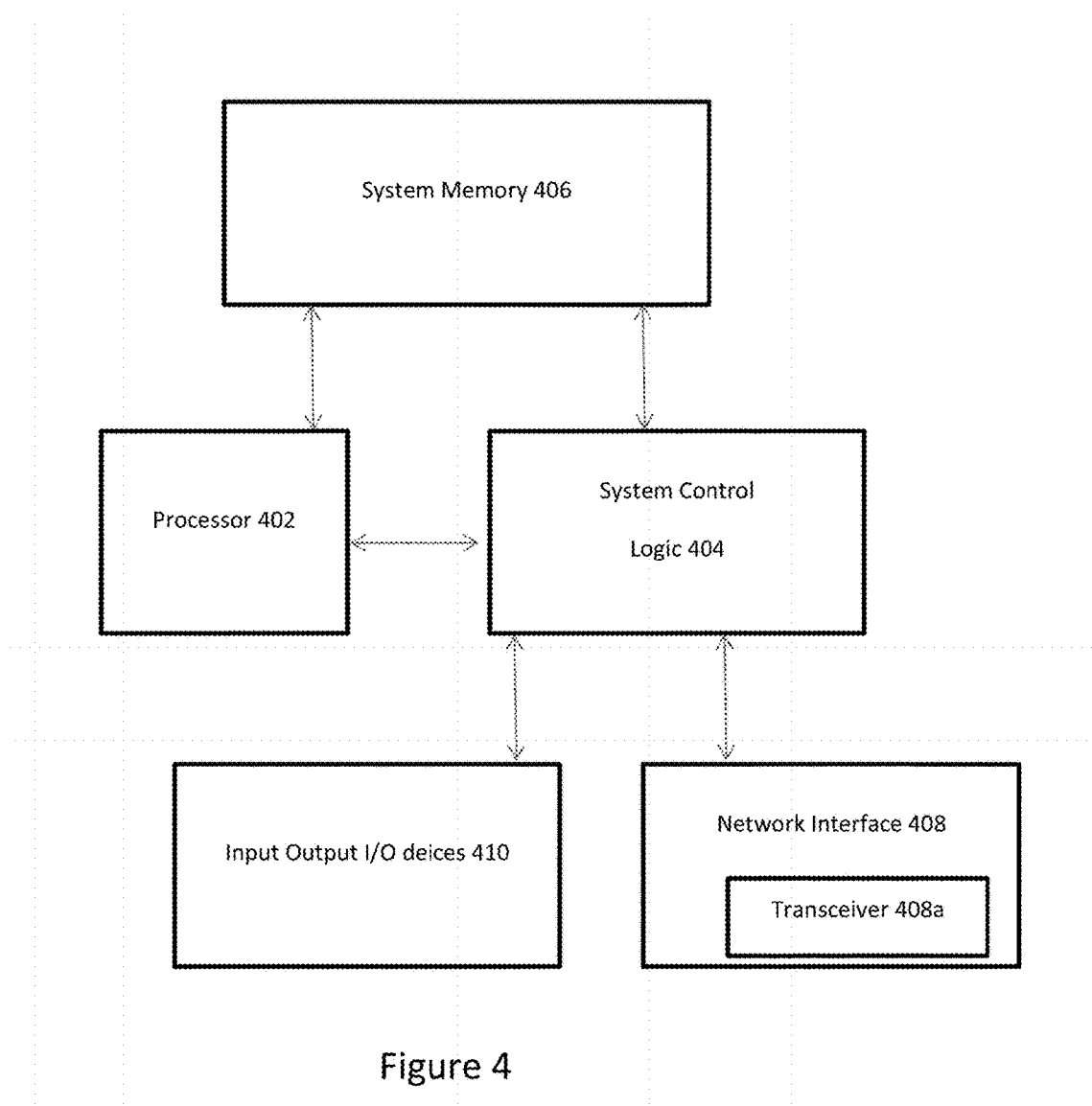
FIG. 4 is a block diagram of an exemplary core network element.

The MME 111, VEPC 160, OTAP server 170, and eNB 106 discussed above are network elements in a packet network as described in FIG. 4. Each network element 111, 160, 170, and 106 should include the elements of network element as illustrated in FIG. 4 (and previously described above). Preferably the network elements are located in the core network or the functions as described herein may be divided among a plurality of network elements inside or outside the core network. However, in other embodiments the network element is not located physically at the core network but is logically located between the core network and an eNodeBs (eNBs). The network element may have a controller, logic, memory, interface, and input/output which may be implemented using any suitable hardware, software and/or firmware configured as shown in FIG. 4. FIG. 4 comprises one or more system control logic 404 coupled with at least one or all of the processor(s) 402, system memory 406, a network interface 408 (including a transceiver 408a), and input/output (I/O) devices 410. The processor(s) 402 may include one or more single-core or multi-core processors. The processor(s) 402 may include any combination of general-purpose processors and dedicated processors (e.g., graphics processors, application processors, baseband processors, etc.). System control logic 404 may include any appropriate interface controllers to provide for any suitable interface to at least one of the processor(s) 402 and/or to any suitable device or component in the packet core network in communication with system control logic 404. System control logic 704 may include one or more memory controller(s) to provide an interface to system memory 406. System memory 406 may be used to load and store data and/or instructions such as the knowledge database and logger function discussed above. System memory 406 may include any suitable volatile memory, such as suitable dynamic random access memory (DRAM), for example. System memory 406 may also include non-volatile memory including one or more tangible, non-transitory computer-readable media used to store data and/or instructions, for example, such as the embodiments described herein. The non-volatile memory may include flash memory, for example, and/or may include any suitable non-volatile storage device(s), such as one or more hard disk drive(s) (HDD(s)), one or more compact disk (CD) drive(s), and/or one or more digital versatile disk (DVD) drive(s). The memory 406 may include a storage resource physically part of a device. For example, the memory 404 may be accessed over a network via the network interface 408 and/or over Input/Output (I/O) devices 410. The transceiver in network interface 408 may provide a radio interface to communicate over one or more network(s) and/or with any other suitable device. Network interface 408 may include any suitable hardware and/or firmware. The network interface 408 may further include a plurality of antennas to provide a multiple input, multiple output radio interface. Network interface 408 may include, for example, a wired network adapter, a wireless network adapter, a telephone modem, and/or a wireless modem. For one embodiment, at least one of the processor(s) 402 may be packaged together with logic for one or more controller(s) of system control logic 404. At least one of the processor(s) 402 may be integrated on the same die with logic for one or more controller(s) of system control logic 404. In various embodiments, the I/O devices 410 may include user interfaces designed to enable user interaction with peripheral component interfaces designed to enable peripheral component interaction and/or sensors designed to determine environmental conditions and/or location information related to the network element or system. In various embodiments, the peripheral component interfaces may include, but are not limited to, a non-volatile memory port, a universal serial bus (USB) port, an audio jack, and a power supply interface.

Alternatively, some embodiments and methods discussed above may be implemented by a non-transitory computer-readable medium storing a program for performing the process. The computer readable medium may store (in any appropriate format) those program elements which are appropriate to perform the method. The term "non-transitory computer readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media may include, for example, optical or magnetic disks and other persistent memory. Volatile media may include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a Random Access Memory (RAM), a programmable read only memory (PROM), an erasable programmable read only memory (EPROM), a flash electrically erasable programmable read only memory (FLASH-EEPROM), any other memory chip or cartridge, a carrier wave as described hereinafter, or any other medium from which a computer can read.

In an embodiment, a server computer, network element or centralized authority may not be necessary or desirable. For example, an embodiment may be practiced on one or more devices without a central authority. In such an embodiment, any functions described herein as performed by the server computer or data described as stored on the server computer may instead be performed by or stored on one or more such devices.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

In this disclosure, devices or networked elements that are described as in "communication" with each other or "coupled" to each other need not be in continuous communication with each other or in direct physical contact, unless expressly specified otherwise.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A computer implemented method for provisioning a User Equipment (UE), the method comprising:
   receiving a signal containing updated temporary identification information from the UE, the UE having provided permanent identification information to a first mobile core network, having received temporary identification information from the first mobile core network, having updated the temporary identification information based on UE location information to produce updated temporary identification information indicating the second mobile core network and having provided the signal containing the updated temporary identification information for delivery, the UE having updated the temporary identification information based on a list of information on locations of the second mobile core network received using an Over The Air Provisioning (OTAP) server;
   forwarding the received signal to the second mobile core network;
   receiving a new temporary identification information indicating the second mobile core network for the UE from the second mobile core network, the new temporary identification information assigned by the second mobile core network after identifying and authenticating the UE using the permanent identification information of the UE; and
   providing the new temporary identification information to the UE.

2. The method of claim 1 further comprising:
   sending a provisioning signal to the UE from an Over The Air Provisioning (OTAP) server which includes the list of information on locations of the second mobile core network and instructions on when and how to rewrite the temporary identification information to form the updated temporary identification information.

3. The method of claim 2, wherein the provisioning signal further includes a precondition for updating the temporary identification information depending on the location of the UE.

4. The method of claim 1, wherein the updated temporary identification information includes a new Globally Unique MME Identifier (GUMMEI) portion of a Globally Unique Temporary UE Identity (GUTI) or a portion of a Packet Temporary Mobile Subscriber Identity (P-TMSI).

5. A computer implemented method for provisioning a User Equipment (UE), the method comprising:
   sending a provisioning signal to the UE from an Over The Air Provisioning (OTAP) server which includes a list of information on locations of a second mobile core network;

receiving a signal containing updated temporary identification information from the UE, the UE having provided permanent identification information to a first mobile core network, having received temporary identification information from the first mobile core network, having updated the temporary identification information based on UE location information to produce updated temporary identification information indicating the second mobile core network and having provided the signal containing the updated temporary identification information for delivery, the UE having updated the temporary identification information based on the list of information on locations of the second mobile core network provided by the OTAP server;

forwarding the received signal to the second mobile core network; and receiving a new temporary identification information indicating the second mobile core network for the UE from the second mobile core network, the new temporary identification information assigned by the second mobile core network after identifying and authenticating the UE using the permanent identification information of the UE; and providing the new temporary identification information to the UE.

6. The method of claim 5 wherein the provisioning signal further includes instructions on when and how to rewrite the temporary identification information to form the updated temporary identification information.

7. The method of claim 6, wherein the provisioning signal further includes a precondition for updating the temporary identification information depending on the location of the UE.

8. The method of claim 5, wherein the updated temporary identification information includes a new Globally Unique MME Identifier (GUMMEI) portion of a Globally Unique Temporary UE Identity (GUTI) or a portion of a Packet Temporary Mobile Subscriber Identity (P-TMSI).

* * * * *